United States Patent [19]

Hughes et al.

[11] 4,044,291

[45] Aug. 23, 1977

[54] ELECTRIC STEPPER MOTORS

[75] Inventors: Austin Hughes; Peter John Lawrenson, both of Leeds, England

[73] Assignee: National Research Development Corporation, London, England

[21] Appl. No.: 616,013

[22] Filed: Sept. 23, 1975

[30] Foreign Application Priority Data

Sept. 25, 1974 United Kingdom ............ 41713/74

[51] Int. Cl.² .................................................. H02K 37/00
[52] U.S. Cl. ........................................ 318/696; 310/49 R
[58] Field of Search ............... 318/138, 259, 696, 585; 310/49, 162–165

[56] References Cited

U.S. PATENT DOCUMENTS 3,445,741   5/1969   Gerber ................................ 318/138

Primary Examiner—Donovan F. Duggan
Attorney, Agent, or Firm—Cushman, Darby & Cushman

[57] ABSTRACT

A stepper motor has impedance in series with each drive coil and the value of the impedance is changed during each drive pulse. Two different paths for current to a drive coil may be provided each having a different value of impedance and the current to the drive coil is switched between the two paths during each drive period.

3 Claims, 4 Drawing Figures

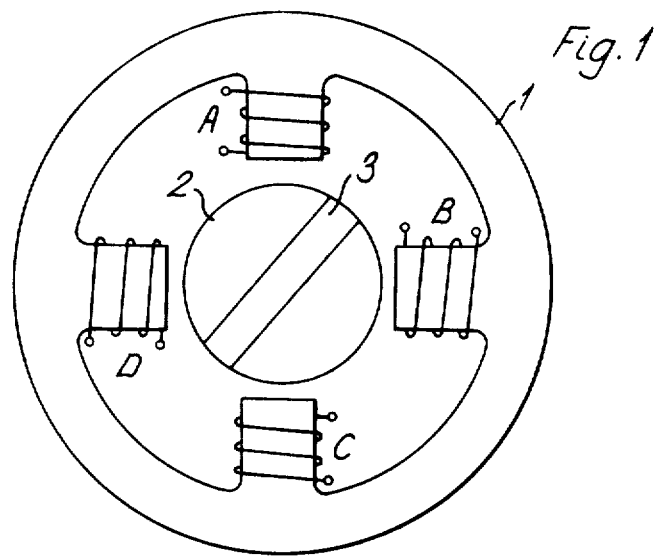
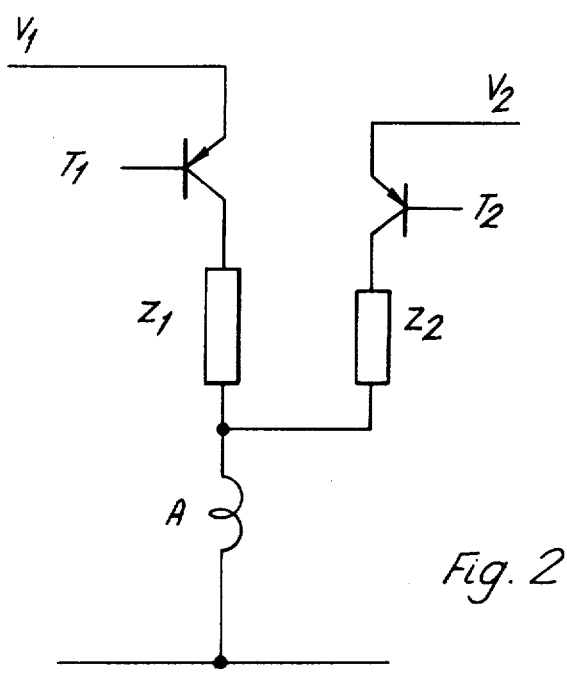

ELECTRIC STEPPER MOTORS

This invention relates to electric stepper motors.

An electric stepper motor comprises a primary member and a secondary member which move relative to each other. The primary member, usually the stator, is wound with a plurality of drive coils having magnetic axes angularly spaced apart from each other and which are arranged to be energised by drive pulses in some switched sequence. The secondary member, usually the rotor, has one or more magnetically defined axes which are fixed relative to the rotor. As the drive pulses are switched to different drive coils the magnetic axes of the secondary member moves to maintain alignment with the magnetic axes of those coils which are energised and thus relative rotation between the primary and secondary members takes place in a manner defined by the swtching of the drive coils. The secondary member may have its axes defined by perment magnetisation or else may have a variable reluctance configuration or the axes may be defined by a combination of both. The conditions required during the initial part of a drive pulse when a rapid build up of current and a high acceleration torque are called for are in general different from those required during the final part of a drive pulse where for good operation of a stepper motor smooth running is desirable. Hitherto design has been undertaken with only the initial conditions in mind although suggestions have been made for damping the motor when the switching of the drive coils is finally stopped by introducing impedance changes in the drive coil circuits or by reducing the final voltage level. However, such arangements do not improve operation of the motor under running conditions when the inherently discontinuous nature of the drive forces causes an oscillatory motion to be superimposed on the rotation of the rotor so adversely affecting the performance of the motor. Well known amongst these adverse effects are the reduction of torque at certain 'resonance'speeds, reversal of rotation and loss of synchronism with the drive pulse sequence.

It is an object of the invention to provide a stepper motor in which the magnitude duration and other effects of such oscillating motion are minimised.

According to the invention an electric stepper motor comprises a primary member wound with a plurality of drive coils having magnetic axes spaced apart from each other and a secondary member having one or more magnetically defined axes so that sequential energisation of the drive coils by drive pulses causes relative movement between the primary and secondary members and wherein switching means is associated with each drive coil which is operated during a drive pulse period to change the impedance in circuit therewith between the initial and final parts of such period.

Preferably two drive coils are energised in each switching step and these coils are adjacent to each other. The impedance switched in circuit with the drive coils may be resistive, inductive or capacitive or a combination thereof and may be of a positive or negative value. The total resistance of a drive coil and impedance connected thereto during the final part of each drive pulse is preferably optimised in accordance with a formula set out below and where this total resistance is less than the actual resistance of a drive coil then the inserted impedance may include an element which acts as a negative resistance.

In order that the invention may be more fully understood reference will now be made to the accompanying drawing in which:-

FIG. 1 shows diagrammatically a stepper motor having a four-pole stator and a two-pole rotor;

FIG. 2 illustrates a circuit for a drive coil incorporating switching means;

Figures 3, 4:
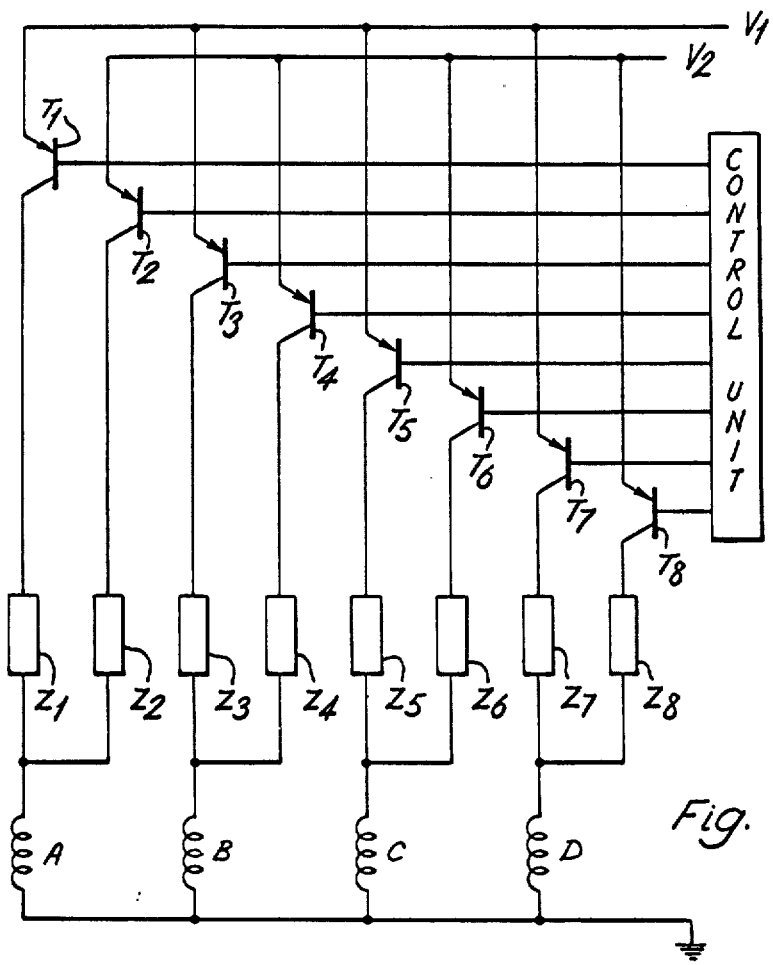
FIG. 3 illustrates a plurlity of circuits of the type shown in FIG. 2 arranged to be used in conjunction with the stepper motor of FIG. 1.
FIG. 4 is a chart showing the sequence of operation of switching means in the circuit arrangement of FIG. 3.

Referring now to FIG. 1 there is shown therein a stepper motor comprising a stator member 1 provided with four poles spaced apart equiangularly around the circumference. Each such pole defines a magnetic axis and the poles are wound with individual drive coils A, B, C and D. The motor is designed to operate by the simultaneous energisation of a pair of adjacent coils successive pairs being energised in sequence. There are thus four steps for one complete revolution of the rotor. In the first step coils A and B are energised, in the second step coils B and C are energised, in the third step coils C and D are energised and in the fourth step coils D and A are energised.

The motor is provided with a rotor member 2 which has a magnetic axis 3 provided by a permanent magnet or else by a variable reluctance type of rotor. When a pair of adjacent stator coils are energised their resultant magnetic axis will lie midway between the poles and the rotor magnetic axis 3 will align itself therewith.

A basic switching circuit suitable for the energisation of one of the coils in the above manner is shown in FIG. 2. As shown in FIG. 2 one coil A has two alternative impedances $Z_1$ and $Z_2$ connected to it and switching is controlled by respective transistors $T_1$ and $T_2$. If desired, transistor $T_1$ can be connected to a voltage $V_1$ while transistor $T_2$ is connected to voltage $V_2$ of value different from voltage $V_1$. In operation transistor $T_1$ is initially switched on for the first part of a drive pulse and at some suitable instant transistor $T_1$ is switched off and transistor $T_2$ switched on to introduce for the final part of the drive pulse a different value of impedance $Z_2$ in series with coil A. Impedance $Z_2$ is preferably optimised in accordance with the formula set out below whereas the value of impedance $Z_1$ is substantially independent of damping considerations and is chosen to allow a high rate of build-up of current. The value of the resistive component $R_1$ of $Z_1$ will frequently be higher than the value of the resistive component $R_2$ of $Z_2$ which for optimum results will be chosen to lie in the range $1.25\Omega_n L < R_2 < 2.5\Omega_n L$ where $\Omega_n$ = natural frequency of rotor and load L = inductance of the circuit comprising the drive coil and the impedance $Z_2$. It will be understood that for the motor shown in FIG. 1 there will be four circuits provided one for each of the coils and each similar to the circuit shown in FIG. 2. This arrangement of the circuits is illustrated in FIG. 3, and the sequence of operation of the associated transistors $T_1$-$T_8$ is shown in FIG. 4. The control unit designated in FIG. 3 may be suitable conventional arrangement for applying in proper sequence biasing signals to the bases of transistors $T_1$-$T_8$.

We claim:

1. An electric stepper motor comprising a primary member having a plurality of drive coils with magnetic axes spaced apart with respect to one another and being adapted to be sequentially energised, and a secondary member having at least one magnetically defined axis whereby energisation of the drive coils during a drive pulse period causes relative movement between the primary and secondary members, first and second impedances of different values joined to each of said drive coils, voltage supply means, and switching means for selectively connecting each of said impedances to the voltage supply means during said pulse drive period, said switching means connecting the first impedance to the voltage supply means during a first portion of the pulse drive period to permit rapid build-up of current in said coil and connecting the second impedance to the voltage supply means during a second portion of the pulse drive period to produce damping of said relative movement.

2. The motor as claimed in claim 1 in which two drive coils adjacent to each other are energised in each switching stage.

3. The motor as claimed in claim 1 in which the total resistance of each drive coil and impedance connected thereto during the second portion of each drive pulse is optimised to lie between 1.25 and 2.5 times $\Omega_n L$ where $\Omega_n$ is the natural frequency of the rotor and its load and L is the inductance of the circuit comprising the drive coil and impedance.

* * * * *